United States Patent [19]

Martin

[11] Patent Number: 4,754,694
[45] Date of Patent: Jul. 5, 1988

[54] FLUID ACTUATOR WITH LOCK POSITION INDICATING MEANS

[75] Inventor: Eugene J. Martin, Portage, Mich.

[73] Assignee: Pneumo Abex Corporation, Boston, Mass.

[21] Appl. No.: 362,643

[22] Filed: Mar. 29, 1982

[51] Int. Cl.$^4$ .................... F01B 25/26; F15B 15/26
[52] U.S. Cl. ........................................ 92/5 L; 92/14; 92/17; 92/25
[58] Field of Search .............. 92/5 R, 5 L, 14, 17, 92/21 R, 21 MR, 23, 24, 25, 28, 33

[56] References Cited

U.S. PATENT DOCUMENTS

| | | | |
|---|---|---|---|
| 2,635,631 | 4/1953 | Seefluth et al. | 92/5 R |
| 3,414,693 | 12/1968 | Watson et al. | 92/5 R |
| 3,621,763 | 11/1971 | Geyer | 92/17 |
| 4,240,332 | 12/1980 | Deutsch | 92/21 MR |
| 4,365,539 | 12/1982 | Martin et al. | 92/17 |

Primary Examiner—Robert E. Garrett
Attorney, Agent, or Firm—Renner, Otto, Boisselle & Sklar

[57] ABSTRACT

A fluid actuator includes a lock mechanism for releasably locking the actuator against movement, and a lock release lever engageable by a lock piston upon application of system pressure thereto to release the lock mechanism. The lock mechanism includes an axially movable lock member for respectively engaging and disengaging the lock mechanism depending on its position. Attached to the movable lock member is a proximity sensor target which moves with the axially movable lock member toward and away from a proximity switch to provide an electrical signal indicating the locked or unlocked condition of the lock mechanism in accordance with the proximity of the target to the switch. A cover may also be provided for respectively concealing or exposing the target depending on the position of the axially movable member to provide a visual indication of the unlocked or locked condition of the lock mechanism.

12 Claims, 2 Drawing Sheets

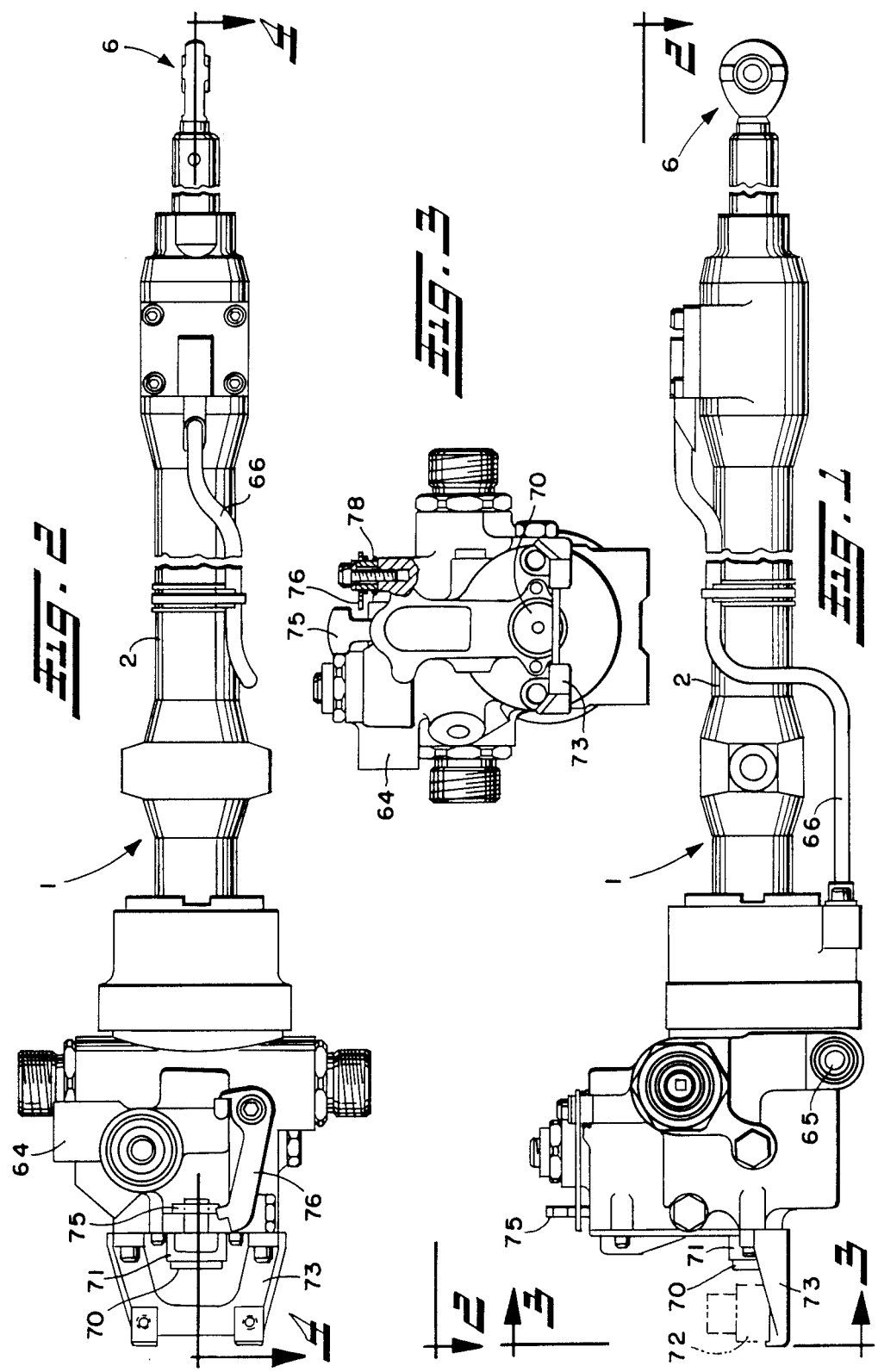

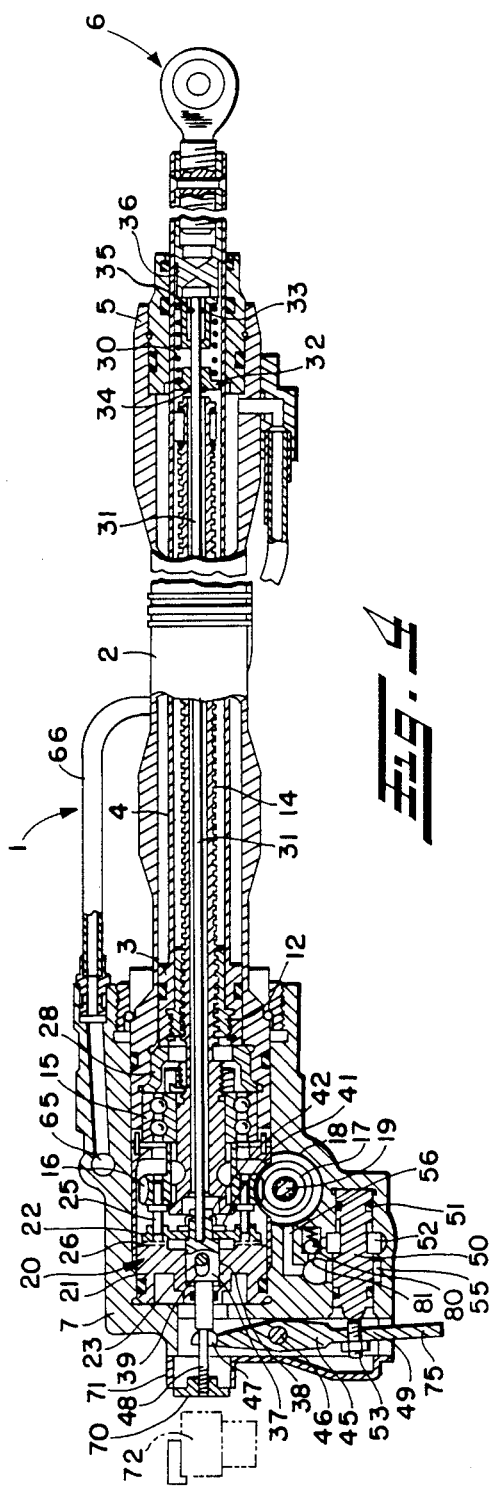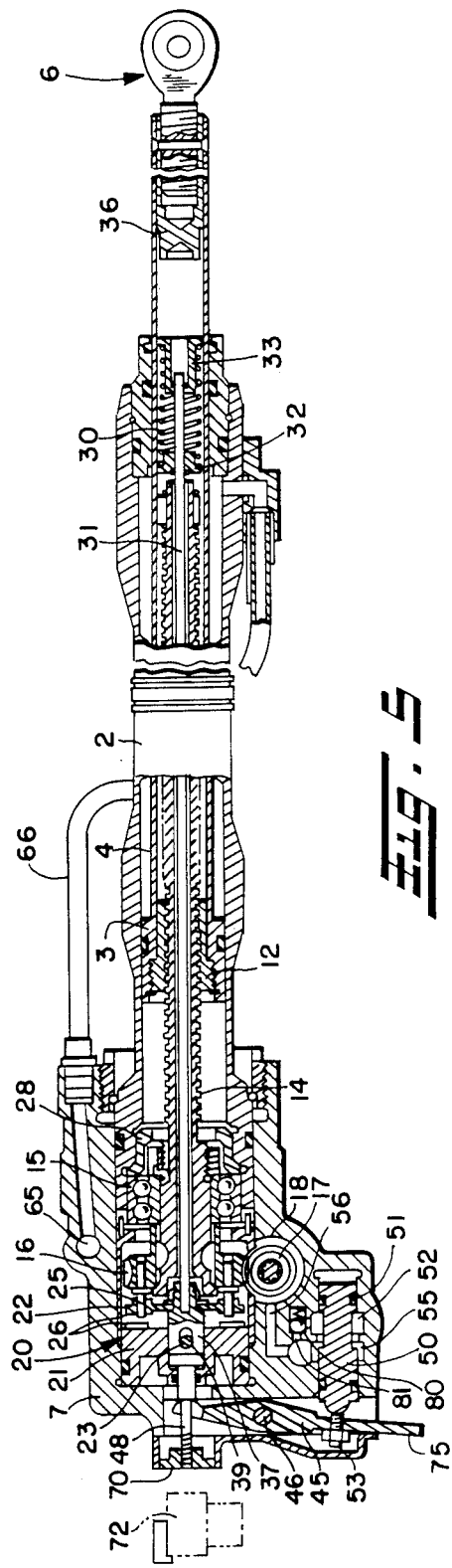

FLUID ACTUATOR WITH LOCK POSITION INDICATING MEANS

BACKGROUND OF THE INVENTION

This invention relates generally, as indicated, to a fluid actuator with lock position indicating means for indicating the locked or unlocked condition of the actuator.

In certain actuator installations, for example where the actuator is used to actuate the thrust reversers for a jet engine, a lock mechanism is provided for releasably locking the actuator against movement in one position. For safety reasons and the like, provision should be made for readily determining whether the lock mechanism is in the engaged or disengaged position. Also, it may be desirable to provide for manual release of the lock mechanism, and for retaining the lock mechanism in the lock disengaged position without having to continually apply a manual lock releasing force thereto.

SUMMARY OF THE INVENTION

With the foregoing in mind, it is a principal object of this invention to provide a fluid actuator of the type described in which the locked or unlocked condition of the lock mechanism may be readily determined.

Another object is to provide such a fluid actuator in which the locked or unlocked condition of the lock mechanism may be sensed electrically.

Still another object is to provide such a fluid actuator in which the locked or unlocked condition of the lock mechanism may be visually sensed.

A further object is to provide such a fluid actuator in which the lock mechanism may be manually unlocked and then mechanically held in the unlocked condition without having to continually apply a manual lock releasing force thereto.

Another object is to provide such a fluid actuator in which the mechanical force that is used to retain the lock mechanism in the unlocked condition following manual release of the lock may be automatically released after the actuator has been extended a predetermined distance.

These and other objects of the present invention may be achieved by providing the actuator with a lock mechanism for locking the actuator against movement in one position, and a lock release lever engageable with the lock mechanism for releasing same. The lock release lever is engageable by a lock piston contained within a bore in the actuator housing upon application of system pressure thereto to release the lock mechanism. The lock mechanism includes an axially movable lock member from which projects an external extension. On the outer end of the external extension is a proximity sensor target which is movable with the axially movable lock member toward and away from a proximity switch. The proximity switch provides an electrical signal indicating the locked or unlocked condition of the lock mechanism in accordance with the proximity of the target to the switch.

A cover may also be provided for respectively concealing and exposing the target depending on the position of the axially movable lock member to provide a visual indication of such position.

Manual release of the lock mechanism may also be accomplished as by manual operation of a handle extension on the lock release lever. When the lock mechanism is manually released, the lock release lever may be retained in the lock disengaging position by engagement by a pivotally mounted lock-out lever, thus freeing the operator's hands. A torsion spring or the like acting on the lock-out lever will automatically disengage the lock-out lever from the lock release lever when the actuator has been extended a sufficient distance to eliminate any spring forces acting on the lock mechanism tending to reengage the lock mechanism.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary side elevation view of a preferred form of fluid actuator in accordance with the present invention;

FIG. 2 is a fragmentary top plan view of the actuator of FIG. 1, substantially as seen from the plane of the line 2—2 thereof;

FIG. 3 is an end elevation view partly in section of the actuator of FIG. 1 as seen from the plane of the line 3—3 thereof;

FIG. 4 is a fragmentary longitudinal section through the actuator of FIG. 2 taken on the plane of the line 4—4 thereof, showing the actuator in the fully stowed and locked position; and FIG. 5 is a fragmentary longitudinal section through the actuator similar to FIG. 4 but showing the actuator partially extended.

DETAILED DESCRIPTION OF THE PREFERRED EMBODIMENT

Referring now in detail to the drawings and initially to FIGS. 1–4 thereof, there is shown a linear actuator 1 which may be of conventional type including a cylinder 2 containing a piston 3. Attached to the piston is a hollow rod 4 which extends through the rod end gland 5 of the cylinder and has a rod end assembly 6 on the outboard end thereof to facilitate connection to the movable or stationary part of the device to be actuated. A suitable mount may also be provided on the actuator housing 7 adjacent the head end of the cylinder for attachment to the other part of the device to be actuated.

In the center of the piston 3 is a high lead Acme nut 12 attached as by threading it into the piston and locking it with a pin. Coupled to the Acme nut is a mating Acme screw shaft 14. One end of the screw shaft 14 is journaled in suitable bearings 15 within the head end of the cylinder, whereas the other end extends into the hollow piston rod 4 a substantial distance beyond the nut 12, whereby as the piston 3 moves back and forth in the cylinder 2, the screw shaft 14 rotates at a speed proportional to the velocity of the piston. Mounted on the screw shaft 14 is a high lead worm wheel 16 which mates with a worm shaft 17 also bearing mounted in a transverse bore 18 in the head end of the actuator. The ends of the worm shaft may be provided with double square holes 19 or the like to facilitate attachment of a synchronous drive shaft or rod thereto. Since the speed of the worm shaft 17 is also proportional to the velocity of the piston rod 14, when the worm shafts of two or more such actuators are thus connected together, they will be mechanically synchronized in both position and motion, as well known in the art.

When the actuator 1 is in the retracted or stowed position illustrated in FIG. 4, the actuator may be locked in such position by a lock mechanism 20 as described hereafter. The lock mechanism shown consists of a stationary lock plate 21 fixedly secured within the actuator housing 7 and a movable lock plate 22 mounted for limited axial movement toward and away from the stationary lock plate. The stationary lock plate 21 is pinned to the housing as by a rod 23 extending from the housing 7 transversely through the plate 21. The movable lock plate 22 is attached to the worm gear 16 by axially extending pins 25 which cause the movable lock plate to rotate with the worm gear while permitting limited relative axial movement therebetween.

The opposed faces of the stationary and movable lock plates 21, 22 have cooperating lock teeth 26 thereon which are shaped in such a manner that when engaged they permit ratcheting of the movable lock plate relative to the stationary lock plate during retraction of the piston but not during extension thereof. Accordingly, the piston 3 will continue to retract until it engages a retractor stop 28 within the head end of the cylinder. However, the piston cannot be extended as long as the lock plates are in engagement with each other, since the lock plates lock the worm gear 16 and screw shaft 14 which drives same against rotation in a direction corresponding to that generated by extending the piston.

When the actuator is retracted as shown in FIG. 4, the movable lock plate 22 is normally maintained in engagement with the stationary lock plate 21 by a spring 30 which may be mounted within the cylinder adjacent the outer end of the screw shaft 14. The spring force is transmitted to the movable lock plate 22 by a lock rod 31 which extends through the center of the screw shaft and has a pair of axially spaced apart spring seats 32, 33 mounted on the outer end thereof for retaining the spring 30 therebetween. Retaining wires 34, 35 or the like on the lock rod 31 limit the maximum separation between the spring seats. Such maximum separation will occur during extension of the actuator as shown in FIG. 5, after which the spring 30 will no longer be effective in transmitting a locking force to the lock mechanism 20 as described hereafter. However, during retraction of the actuator, as the piston 3 approaches the end of its stroke, a rod end insert 36 within the outer end of the piston rod 4 engages the outer spring seat 33 urging it toward the inner spring seat 32, thus compressing the spring 30 sufficiently to cause the lock rod 31 to move axially inwardly toward the movable lock plate 22.

The inner end of the lock rod 31 is attached to a lock release pin 37 axially slidable within a central bore 38 within the stationary lock plate 21. The rod 23 which is used to lock the plate 21 against movement extends through an elongated slot 39 in the lock release pin so as not to obstruct its axial movement. The lock release pin 37 has a reduced diameter portion on the inner end thereof on which the movable lock plate 22 is rotatably mounted and retained in place as by means of a lock plate washer 41 held on the reduced diameter portion by a swage ring 42. Accordingly, such axial inward movement of the lock rod 31 will be transmitted to the movable lock plate 22 through the lock release pin 37.

With the actuator 1 in the stowed and locked position illustrated in FIG. 4, before the actuator can be extended, the lock 22 must be released. To release the lock, a lock release lever 45 may be provided adjacent the outer end of the lock release pin 37. The lock release lever 45 is mounted on a shaft 46 on the exterior of the actuator housing 7 to isolate the lock release lever from the internal hydraulic fluid used to actuate the actuator. The inner end 47 of the lock release lever 45 which engages the lock release pin 37 may be slotted to permit a rod extension 48 on the lock release pin to extend outwardly therebeyond for a purpose to be subsequently described. The other end 49 of the lock release lever may be engageable by a lock piston 50 contained within a bore 51 in the actuator housing. The bore 51 has a lock-in annulus 52 which when pressurized urges the lock piston 50 into engagement with the lock release lever 45 causing the same to pivot about the shaft 46 and move the lock release pin 37 axially inwardly against the force of the spring 30 to disengage the movable lock plate 22 from the stationary lock plate 21. An adjustment screw 53 may be provided on the lock release lever for transmitting the force from the lock piston to the lock release lever. Such an adjustment screw 53 may be used to minimize free play and provide for adjustment of the extreme end positions of movement of the lock release lever by the lock piston.

Before the lock piston 50 can move the lock release lever in a direction to release the lock, the pressure applied to the lock piston must overcome the preload of the spring 30. Moreover, after the lock piston has been moved far enough to cause the lock teeth on the movable lock plate 22 to disengage from the lock teeth on the stationary lock plate 21, the fluid pressure acting on the lock piston will also be admitted to the extend side of the actuator through another annulus 55 in the lock piston bore 51 which is uncovered by the lock piston following such movement as shown in FIG. 5. This annulus 55 communicates with the head end of the cylinder through a passage 56 in the cylinder housing 7.

Before fluid pressure is admitted to the lock-in annulus 52 through the extend port 64 for effecting release of the lock, system pressure is desirably applied to the retract end of the cylinder through the retract port 65 and porting tube 66 to remove any axial tension loads on the actuator which might otherwise interfere with release of the lock. Then, with the system pressure still applied to the retract port, system pressure is also applied to the lock-in annulus 52, first to release the lock, and then to apply extend pressure to the head end of the actuator in the manner previously described. Since the area of the piston 3 exposed to the extend pressure is greater than that exposed to the retract pressure, the actuator will extend. As it does so, the outer spring seat 33 will move away from the inner spring seat 32 until it engages the retaining wire 35 as shown in FIG. 5, at which point there is no longer any spring loading of the lock mechanism.

A proximity sensor target 70 is provided on the outer end of the rod extension 48 to indicate visually whether or not the actuator lock is engaged. When the lock is engaged, the target 70 will extend slightly outwardly beyond the surrounding linkage cover 71 as illustrated in FIGS. 1,2 and 4 to provide a visual indication of such locked condition, whereas when the lock is released as in FIG. 5, the target will be concealed within the cover. A contrasting, highly visible paint or other surface coating may be applied to the target to make it more visible.

A proximity switch 72 supported by a mounting bracket 73 adjacent the target also provides an electrical signal indicating to the operator the locked or unlocked condition of the lock mechanism in accordance with the proximity of the target to the switch.

To retract the actuator, the pressure acting on the extend side of the piston 3 is reduced, as by connecting the extend port 64 to return pressure, while still maintaining system pressure on the retract side of the piston. During retraction of the piston, the movable lock plate 22 is maintained out of engagement with the stationary lock plate 21 by the return pressure acting on the lock piston 50 until the rod end insert 36 contacts the spring seat 33 and compresses the spring 30 sufficiently to overcome the force exerted by the lock piston and push the movable lock plate into engagement with the stationary lock plate. This normally occurs within the last 3/10 inch or so of the retract stroke. However, the actuator will continue to move in the stow direction until the actuator piston 3 engages the internal stop 28 because of the torque developed by the screw shaft 14 which causes the lock teeth on the movable lock plate to ratchet over the teeth on the stationary lock plate. When the actuator piston engages the retract stop, the screw shaft 14 also stops, and since the lock teeth on the stationary and movable lock plates 21, 22 are already in engagement with each other, any motion that tends to extend the actuator will cause the locking faces of the lock teeth to engage thus providing a positive lock against such motion.

As the lock piston returns to its fully retracted position shown in FIG. 4, fluid communication between the lock-in annulus 52 and extend side of the piston is blocked through the lock piston. However, return flow from the extend side of the piston still occurs through a check valve 80 in another passage 81 in the actuator housing providing communication between the extend side and port 52.

Manual release of the lock may also be accomplished as providing an extension handle 75 on the lock release lever 45 extending outwardly beyond the actuator housing. To disengage the lock manually, the only action required is to push or pull the extension handle 75 in a direction causing the inner end of the lock release lever to engage the outer end of the lock release pin 37 and unseat the movable lock plate 22 from the stationary lock plate 21. A lock-out lever 76 may also be provided on the housing 7 which when moved into position, will hold the lock release lever 45 in the lock disengaging position, thus freeing the operator's hands. After manual release of the lock, the actuator can be extended mechanically by rotating the worm shaft 17 using a suitable mechanical drive mechanism connected thereto. Once the actuator has been extended a sufficient distance, for example, slightly more than 3/10 inch, the lock spring 30 will be sufficiently lengthened that there will be little or no spring force acting on the lock release lever, at which point a small torsion spring 78 or the like, best seen in FIG. 3, will automatically disengage the lock-out lever from the lock release lever returning same to its original position.

From the foregoing, it will now be seen that the fluid actuator of the present invention provides a very effective and simple means for determining either visually or electrically whether the lock mechanism is engaged or disengaged. Also, the lock mechanism may be manually unlocked and then mechanically held in the unlocked condition without having to continually apply a manual lock release force to the lock mechanism.

Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A fluid actuator comprising an actuator housing, a cylinder containing a piston-rod assembly that is extendable under pressure, releasable lock means for releasably locking said piston-rod assembly against movement, said releasable lock means including an axially movable lock member movable between a first position locking said piston-rod assembly against movement and a second position permitting such movement, means mounted for axial movement with said axially movable lock member for indicating the position of said axially movable lock member, a pivotally mounted lock release lever movable into engagement with said axially movable lock member for effecting axial movement thereof to the lock disengaging position, said lock release lever having a manually movable external extension handle on the outer end thereof, a lock-out lever on said actuator housing movable into engagement with said extension handle on said lock release lever for holding said lock release lever in the lock disengaging position, and spring means for disengaging said lock-out lever from said extension handle after said piston-rod assembly has been extended a predetermined amount.

2. A fluid actuator comprising an actuator housing, a cylinder, a piston axially movable within said cylinder, a member rotatably journaled in said cylinder and operatively connected to said piston such that axial movement of said piston effects and is dependent on rotation of said member, releasable lock means engageable with said member for preventing rotation of said member thereby locking said piston against movement, and lock release means for releasing said lock means, said lock means including a first part axially movable into and out of locking engagement with a second part, means mounted for axial movement with said first part for indicating whether said first part is in or out of locking engagement with said second part, said means mounted for axial movement with said first part comprising a target connected to said first part for axial movement therewith, and proximity switch means mounted on said actuator housing adjacent said target for providing an electrical signal indicating whether said first part is in or out of locking engagement with said second part in accordance with the proximity of said target to said proximity switch means, an axial extension on said first part, said target being mounted on the outer end of said axial extension externally of said actuator housing, said lock release means comprising a pivotally mounted lock release lever movable into engagement with said first part for moving said first part out of locking engagement with said second part, said lock release lever having a slot in the inner end thereof through which said axial extension extends, a manually movable external extension handle on the outer end of said lock release lever, and a lock-out lever movable into engagement with said extension handle for holding said lock release lever in the lock disengaging position thus freeing said piston for axial movement, and spring means for disengaging said lock-out lever from said lock release lever after said piston has moved axially a predetermined distance.

3. A fluid actuator comprising a housing, a cylinder containing a piston-rod assembly that is extendable under pressure, releasable lock means for releasably locking said piston-rod assembly against movement, said releasable lock means including an axially movable lock member movable between a first position locking said piston-rod assembly against movement and a second position permitting such movement, a pivotally mounted lock release lever movable into engagement with said axially movable lock member for effecting axial movement thereof to the lock disengaging position, said lock release lever having a manually movable external extension handle on the outer end thereof, a lock-out lever on said housing movable into engagement with said extension handle on said lock release lever for holding said lock release lever in the lock disengaging position, and spring means for disengaging said lock-out lever from said extension handle after said piston-rod assembly has been extended a predetermined amount.

4. The actuator of claim 3 further comprising an external extension on said axially movable lock member extending axially outwardly beyond said housing, and cover means on said housing for concealing the outer end of said external extension when said axially movable lock member is in one of said positions, said outer end of said extension extending outwardly of said cover means to expose said outer end when said axially movable lock member is in the other of said positions to provide a visual indication of such position.

5. The actuator of claim 4 further comprising a target on the outer end of said external extension, and proximity switch means mounted on said housing in axial alignment with said target and axially spaced therefrom for providing an electrical signal to indicate the position of said axially movable lock member in accordance with the proximity of said target to said proximity switch means.

6. The actuator of claim 4 wherein said lock release lever has a slot in the inner end thereof through which said external extension extends outwardly beyond said inner end for providing a visual indication of the position of said axially movable lock member.

7. A fluid actuator comprising a housing, a cylinder containing a piston-rod assembly that is extendible under pressure, releasable lock means within said housing for releasably locking said piston-rod assembly against movement, said releasable lock means including an axially movable lock member movable between a first position locking said piston-rod assembly against movement and a second position permitting such movement, an external extension on said axially movable lock member extending axially outwardly beyond said housing, cover means on said housing for concealing the outer end of said external extension when said axially movable lock member is in one of said positions, said outer end of said extension extending outwardly of said cover means to expose said outer end when said axially movable lock member is in the other of said positions to provide a visual indication of such position, a pivotally mounted lock release lever movable into engagement with said axially movable lock member for effecting axial movement thereof to the lock disengaging position, said lock release lever having a manually movable external extension handle on the outer end thereof, and said lock release lever having a slot in the inner end thereof through which said external extension extends outwardly beyond said inner end for providing a visual indication of the position of said axially movable lock member, a target on the outer end of said external extension, and proximity switch means in axial alignment with said target and axially spaced therefrom for providing an electrical signal to indicate the position of said axially movable lock member in accordance with the proximity of said target to said proximity switch means.

8. The actuator of claim 7 wherein said outer end of said external extension has a contrasting, highly visible surface coating thereon.

9. A fluid actuator comprising a housing, a cylinder containing a piston axially movable therein, a member rotatably journaled in said cylinder and operatively connected to said piston such that axial movement of said piston effects and is dependent on rotation of said member, releasable lock means within said housing engageable with said member for preventing rotation of said member thereby locking said piston against movement, lock release means for releasing said lock means, said lock release means including a first part axially movable into and out of locking engagement with a second part, and means mounted for axial movement with said first part for indicating whether said first part is in or out of locking engagement with said second part, said last-mentioned means comprising an axial extension on said first part, a target mounted on the outer end of said axial extension externally of said housing for axial movement therewith, and proximity switch means mounted on said housing in axial alignment with said target and spaced therefrom for providing an electrical signal indicating whether said first part is in or out of locking engagement with said second part in accordance with the proximity of said target to said proximity switch means.

10. The actuator of claim 9 further comprising a mounting bracket on said housing for said proximity switch means.

11. The actuator of claim 9 further comprising cover means on said housing for respectively concealing and exposing said target depending on whether said first part is in or out of locking engagement with said second part to provide a visual indication of the unlocked or locked condition of said lock means.

12. The actuator of claim 9 wherein said lock release means comprises a pivotally mounted lock release lever movable into engagement with said first part for moving said first part out of locking engagement with said second part, said lock release lever having a slot in the inner end thereof through which said axial extension extends outwardly beyond said inner end for providing a visual indication of the position of said first part.

* * * * *